United States Patent
Patoux et al.

(10) Patent No.: US 8,323,532 B2
(45) Date of Patent: Dec. 4, 2012

(54) POSITIVE ELECTRODE MATERIAL FORMED BY A LAMELLAR-TYPE OXIDE FOR A LITHIUM BATTERY

(75) Inventors: Sébastien Patoux, Fontaine (FR); Carole Bourbon, Saint-Michel de Saint-Geoirs (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 193 days.

(21) Appl. No.: 12/996,510

(22) PCT Filed: May 28, 2009

(86) PCT No.: PCT/FR2009/000625
§ 371 (c)(1),
(2), (4) Date: Dec. 20, 2010

(87) PCT Pub. No.: WO2009/147315

PCT Pub. Date: Dec. 10, 2009

(65) Prior Publication Data

US 2011/0089369 A1     Apr. 21, 2011

(30) Foreign Application Priority Data

Jun. 5, 2008 (FR) ...................... 08 03139

(51) Int. Cl.
*H01B 1/08* (2006.01)
*C01G 45/00* (2006.01)
*C01G 53/00* (2006.01)
*H01M 10/36* (2010.01)
*H01M 4/50* (2010.01)
*H01M 4/52* (2010.01)

(52) U.S. Cl. ............ 252/521.2; 423/594.4; 429/224
(58) Field of Classification Search ............ 252/521.2; 429/223, 224, 231.95; 423/594.4
See application file for complete search history.

(56) References Cited

U.S. PATENT DOCUMENTS

| | | | | |
|---|---|---|---|---|
| 5,443,929 A | * | 8/1995 | Yamamoto et al. | 429/224 |
| 6,677,082 B2 | * | 1/2004 | Thackeray et al. | 429/224 |
| 6,680,143 B2 | * | 1/2004 | Thackeray et al. | 429/224 |

(Continued)

FOREIGN PATENT DOCUMENTS

EP     1 837 937 A1     9/2007

(Continued)

OTHER PUBLICATIONS

Johnson et al., "Lithium-manganese oxide elctrodes with layered-spinel composite structures $xLi_2MnO_3 \cdot (1-x)Li_{1+y}Mn_{2-y}O_4$ ($0<x<1$, $0 \leq y \leq 0.33$) for lithium batteries," Electrochemistry Communications 7, 2005, pp. 528-536.

(Continued)

*Primary Examiner* — Mark Kopec
(74) *Attorney, Agent, or Firm* — Oliff & Berridge, PLC

(57) ABSTRACT

A lamellar-type oxide, in particular used as active material of a positive electrode for a lithium battery and to a method for synthesizing such an oxide. The oxides are used as active materials for the positive electrode of a lithium battery. With such oxides, the specific capacity of a lithium battery is improved and stabilized on cycling.

22 Claims, 4 Drawing Sheets

U.S. PATENT DOCUMENTS

2005/0136329 A1    6/2005    Howard, Jr. et al.

FOREIGN PATENT DOCUMENTS

WO    WO 2004/107480 A2    9/2004
WO    WO 2008/086041 A1    7/2008

OTHER PUBLICATIONS

Thackeray et al., "Comments on the structural complexity of lithium-rich $Li_{1+x}M_{1-x}O_2$ electrodes (M=Mn, Ni, Co) for Lithium batteries," Electrochemistry Communications 8, 2006, pp. 1531-1538.

Kim et al., "Electrochemical and Structural Properties of $xLi_2M'O_3\cdot(1-x)LiMn_{0.5}Ni_{0.5}O_2$ Electrodes for Lithium Batteries (M'=Ti, Mn, Zr; $0 \leq x \leq 0.3$)," Chem. Mater. 2004, 16, pp. 1996-2006.

Thackeray et al., "Advances in manganese-oxide 'composite' electrodes for lithium-ion batteries," Journal of Materials Chemistry, 15, 2005, pp. 2257-2267.

International Search Report issued in International Application No. PCT/FR2009/000625, mailed on Oct. 16, 2009. (with English-language translation).

* cited by examiner

POSITIVE ELECTRODE MATERIAL FORMED BY A LAMELLAR-TYPE OXIDE FOR A LITHIUM BATTERY

BACKGROUND OF THE INVENTION

The invention relates to a lamellar-type oxide, in particular used as active material of a positive electrode for a lithium battery and to a method for synthesizing such an oxide.

STATE OF THE ART

Lithium batteries are progressively replacing nickel-cadmium (Ni—Cd) or metallic nickel-hydride (Ni-MH) batteries as autonomous power source, in particular in portable equipment. This tendency can be explained by the continuous improvement of the performances of lithium batteries giving them substantially higher mass and volume energy densities than those of Ni—Cd and Ni-MH batteries. Thus, whereas the first Li-ion type lithium batteries had a mass energy density of about 85 Wh/kg, a mass energy density of about 200 Wh/kg can be obtained at present. For comparison purposes, Ni—MH batteries and Ni—Cd batteries respectively have a mass energy density of 100 Wh/kg and 50 Wh/kg.

However, to efficiently meet the requirements of new applications which present ever-increasing power demands, lithium batteries have to be further improved. Improving the performances of Li-Ion batteries and in particular increasing their capacity are closely related to the search for new active electrode materials.

At present, the active materials generally used for negative electrodes in commercial lithium batteries are carbon (graphite, coke, . . . ), a spinel oxide of $Li_4Ti_5O_{12}$ type or a metal forming an alloy with lithium such as Sn or Si.

In general, the active materials used for positive electrodes in commercial lithium batteries are compounds of lamellar-type structure, such as $LiCoO_2$ and $LiNiO_2$ oxides, or compounds of spine structure such as $LiMn_2O_4$ and derivatives thereof.

It is however well known that the active material of the positive electrode of Li-Ion batteries is currently the limiting factor for obtaining an increase of the mass energy density.

One path for improvement consists in increasing the redox potential of the active material of the positive electrode. Active materials for positive electrodes presenting a high-voltage electrochemical activity, of more than 4.2 V with respect to the redox potential of the LOU pair (also noted 4.2 V vs $Li^+/Li$), have thus been developed over the past few years in order to increase the energy density of Li-Ion batteries. Among these promising new compounds, the following are noteworthy:

compounds of $LiCoPO_4$ and $LiNiPO_4$ type respectively with redox potentials of 4.8 V and 5.1 V versus the redox potential of the $Li^+/Li$ pair, and spinet oxides of $LiNi_{0.5}Mn_{1.5}O_4$ type with a redox potential of 4.7 V vs. $Li^+/Li$.

However, to be able to use such compounds in commercial batteries, these compounds have to be further improved and the electrode/electrolyte interface has to be stabilized at high voltage as the lifetime is about a few tens of cycles and is therefore low. These compounds furthermore have low theoretical specific capacities generally comprised between 145 and 170 mAh/g.

Another possible path for improvement consists in finding active materials for the positive electrodes of lithium batteries having higher specific capacities than the active materials used at present.

Lamellar-type oxides of $LiMO_2$ type, where M represents a transition element such as cobalt, do however enable theoretical capacities that are among the highest to be obtained. The theoretical capacities are in fact comprised between about 270 to 300 mAh/g, according to the molar mass of the transition element. In practice however, the capacity obtained is generally about 150 mAh/g, due to the obligation of preserving the structural coherence of such oxides.

Alternative compounds have thus been proposed to replace lamellar oxides of $LiMO_2$ type. It has for example been proposed to use several transition metals in lamellar-type oxides. For example the $LiNi_{0.8}Co_{0.15}Al_{0.05}O_2$ and $LiNi_{1/3}Co_{1/3}Mn_{1/3}O_2$ compounds, also of lamellar-type structure, enable similar or substantially higher electrochemical performances to be obtained than oxides of $LiMO_2$ type for lower or equal cost and an improved chemical stability in particular in charged state.

Among the active materials proposed recently in the literature, oxides of $xLi_2M'O_3.(1-x)LiMO_2$ type, where:

x is comprised between 0 and 1
M is an element such as Mn, Ni or Co
M' is an element such as Mn, Ti or Zr are presented as materials enabling high specific capacities and therefore high energy density Li-Ion batteries to be obtained.

In particular, the article by Jeom-Soo Kim et al. ("Electrochemical and Structural Properties of $xLi_2M'O_3.(1-x)LiMn_{0.5}Ni_{0.5}O_2$ Electrodes for Lithium Batteries (M'=Ti, Mn, Zr; $0 \leq x \leq 0.3$)", Chem Mater. 2004, 16, 1996-2006) studies the structural and electrochemical properties of electrodes comprising an active material of $xLi_2M'O_3.(1-x)LiMn_{0.5}Ni_{0.5}O_2$ type, with M'=Ti, Mn, Zr and $0 \leq x \leq 0.3$ compared with a metallic lithium reference electrode. Such oxides have the particularity of presenting multiple electrochemical phenomena associated with the changes of oxidation degrees of the different transition elements. This enables high specific capacities to be obtained in certain cases, paving the way for development of particularly attractive active materials. However, it is not sure that the specific capacity can be maintained with such materials when cycling takes place. A decrease of the specific capacity can in fact be observed in the course of the charging/discharging cycles. A great deal of progress therefore still remains to be made in order to propose active materials for positive electrodes enabling a high and stabilized specific capacity to be obtained, therefore providing Lithium-Ion batteries with improved performances.

International Patent application WO-A-2004107480 proposes using lamellar oxides of formula $Li_xMn_yM_{1-y}O_2$, where $x \leq 0.20$. Mn is in a +4 oxidation state and M is at least a transition metal or another metal cation having an ionic radius able to be inserted in the structure without breaking the latter unduly.

In Patent application US2005/0136329, the electrochemical performances of materials having the general formula $Li\{Li_{(1-2x)/3}Mn_{(2-x)/3}Ni_x\}O_2$ is improved by doping said materials with a divalent cation chosen from Ca, Cu, Mg and Zn.

OBJECT OF THE INVENTION

The object of the invention is to propose active materials for the positive electrode remedying the shortcomings of materials according to the prior art and in particular, in the field of lithium batteries, enabling a stabilized in cycling and high specific capacity to be obtained, advantageously at all the cycling temperatures usually used and in the usual range of potentials.

According to the invention, this object is achieved by the appended claims.

In particular, this object is achieved by a new family of lamellar-type oxides of following general formula:

$$xLi_2MnO_3.(1-x)LiM^1{}_aM^2{}_bM^3{}_cO_2$$

where:
- x is about 0.75,
- $M^1$ is a chemical element chosen from a first group formed by Mn, Ni, Co, Fe, Ti, Cr, V and Cu,
- $M^3$ is at least a chemical element chosen from a second group formed by Mg, Zn, Al, Na, Ca, Li, K, Sc, B, C, Si, P and S,
- $M^2$ is a chemical element chosen from the first group and the second group and is different from $M^1$ and from $M^3$,
- a+b+c=1, with a, b and c not zero.

According to a development of the invention, the lamellar-type oxide is represented by the following formula:

$$0.75Li_2MnO_3.0.25LiNi_{0.9}Mn_{0.05}Mg_{0.05}O_2.$$

According to another development of the invention, it is represented by the following formula:

$$0.75Li_2MnO_3.0.25LiNi_{0.6}Mn_{0.2}Mg_{0.2}O_2.$$

BRIEF DESCRIPTION OF THE DRAWINGS

Other advantages and features will become more clearly apparent from the following description of particular embodiments of the invention, given as non-restrictive examples only and represented in the accompanying drawings in which.

DESCRIPTION OF PARTICULAR EMBODIMENTS

Figure 1:
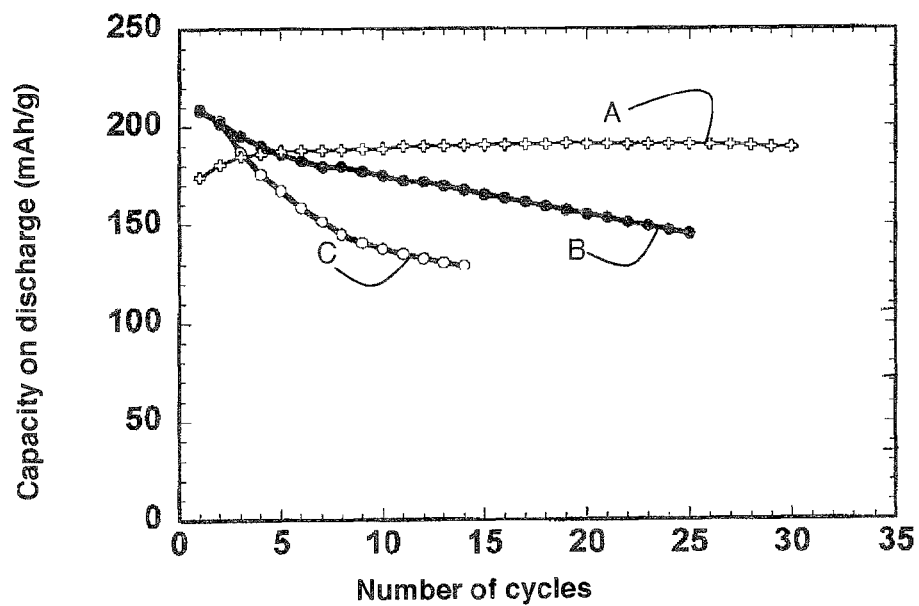
FIG. 1 represents the variation of the specific capacity on discharge versus the number of cycles, in intentiostatic mode (C/10 conditions, 55° C.), of Lithium batteries comprising lithium as active material for the negative electrode and respectively $0.75Li_2MnO_3.0.25LiNiO_2$, $0.75Li_2MnO_3.0.25LiNi_{0.6}Mg_{0.2}Mn_{0.2}O_2$ and $0.7Li_2MnO_3.0.3LiMn_{1/3}Ni_{1/3}Co_{1/3}O_2$ as active material for the positive electrode.

Lamellar-type oxides of the following general formula:

$$xLi_2MnO_3.(1-x)LiM^1{}_aM^2{}_bM^3{}_cO_2 \qquad (1)$$

where:
- x is about 075,
- $M^1$ is a chemical element chosen from a first group formed by Mn, Ni, Co, Fe, Ti, Cr, V and Cu,
- $M^3$ is at least a chemical element chosen from a second group formed by Mg, Zn, Al, Na, Ca, Li, K, Sc, B, C, Si, P and S,
- $M^2$ is a chemical element chosen from the first group and the second group and is different from $M^1$ and from $M^3$,
- a+b+c=1, with a, b and c not zero, are advantageously used as active positive electrode materials for a lithium battery.

In particular, it has been found that such oxides are capable of delivering a high specific capacity over a large number of charging/discharging cycles while at the same time enabling the specific capacity on cycling to be stabilized.

Compared with $xLi_2M'O_3.(1-x)LiMO_2$ oxides and in particular with the $xLi_2M'O_3.(1-x)LiMn_{0.5}Ni_{0.5}O_2$ oxides reported in the above-mentioned article by Jeom-Soo Kim, oxides of the general formula (1) comprise at least one electrochemically inactive chemical element ($M^3$), also called chemical element devoid of electrochemical activity.

What is meant by electrochemically inactive chemical element is a chemical element that does not oxidize or that is not reduced during charging or discharging of a lithium battery, in the usual range of potentials. $M^3$ is more particularly at least a chemical element chosen from the group formed by Mg, Zn, Al, Na, Ca, Li, K, Sc, B, C, Si, P and S. $M^3$ can thus also be formed by several of the chemical elements of the above-mentioned group. $M^3$ thereby enables the specific capacity on cycling to be indirectly stabilized.

$M^3$ is further associated:
- with an electrochemically active chemical element $M^1$ chosen from Mn, Ni, Co, Fe, Ti, Cr, V and Cu.
- and with a chemical element $M^2$. The element $M^2$ can either be electrochemically active, in which case it is chosen from Mn, Ni, Co, Fe, Ti, Cr, V and Cu, or it can be electrochemically inactive and therefore chosen from Mg, Zn, Al, Na, Ca, Li, K, Sc, B, C, Si, P and S. $M^2$ is further chosen so as to be different from $M^1$ and from $M^2$.

Advantageously, in the general formula (1), $M^1$ is nickel, $M^2$ is manganese and $M^3$ is magnesium. b is moreover preferably equal to c.

The positive electrode of a lithium battery can thus comprise a majority quantity of an oxide of the general formula (1) as active material. The positive electrode advantageously comprises minority quantities of an organic binder such as a polyether, a polyester, a polymer with a base of methyl methacrylate, acrylonitrile, or vinylidene fluoride and an electron-conducting additive such carbon.

The lithium battery also comprises a negative electrode the active material of which can be of any known type. For example, the active material of the negative electrode can be lithium in metal form or it can be a material able to insert and de-insert Li+ ions, such as carbon in general in graphite form, an oxide such as $Li_4Ti_5O_{12}$ or a compound forming an alloy with lithium such as silicon or tin.

Finally, the electrolyte of the lithium battery in general comprises a lithium salt for example chosen from $LiClO_4$, $LiAsF_6$, $LiPF_6$, $LiBF_4$, $LiR_FSO_3$, $LiCH_3SO_3$, $LiN(R_FSO_2)_2$, $LiC(R_FSO_2)_3$, lithium bis(trifluoromethanesulphonyl)imide (also noted $LiT_FSI$), lithium bis(oxalato)borate (also noted LiBOB), lithium bis(perfluoroethylsulfonyl)imide (also noted LiBETI), or lithium fluoroalkylphosphate (LiFAP). $R_F$ is a radical chosen from a fluorine atom and a perfluoroalkyl group containing between one and eight carbon atoms. The lithium salt is further preferably dissolved in an aprotic polar solvent. The salt is for example supported by a separating element arranged between the two electrodes of the battery, the separating element then being imbibed with electrolyte. In the case of a lithium battery comprising a polymer electrolyte, the lithium salt is not dissolved in an organic solvent, but in a solid polymer composite such as polyethylene oxide (PEO), poly(acrylonitrile) (PAN), poly(methyl methacrylate) (PMMA), poly(vinylidene fluoride) (PVdF), polyvinyl chloride (PVC) or a derivative thereof.

Moreover, to achieve high specific capacities, the voltage cycling boundary limits of the battery have to be from about 2 to 3V vs. Li+/Li for the lower limit and from about 4.6 to 4.8 V vs. Li+/Li for the upper limit. The mean operating voltage is generally about 3.4 to 3.8 V vs. Li+/Li on discharge.

According to a first example embodiment (hereafter noted Example n° 1), the $0.75Li_2MnO_3.0.25LiNi_{0.6}Mn_{0.2}Mg_{0.2}O_2$ compound was synthesized and then tested in a lithium battery of "buttoncell" format.

The $0.75Li_2MnO_3.0.25LiNi_{0.6}Mn_{0.2}Mg_{0.2}O_2$ compound is in particular obtained by intimately mixing 2 g of a previously synthesized precursor A and 1.502 g of lithium hydroxide $LiON.H_2O$, by heating the mixture at 900° C. for 24 hours and then cooling it very quickly to ambient temperature (quenching). In particular, the precursor A was previously synthesized from:
- an aqueous solution of 0.1 L containing 12.095 g of manganese sulphate ($MnSO_4$), 3.389 g of nickel sulphate ($NiSO_4.3.95H_2O$) and 1.232 g of magnesium sulphate ($MgSO_4.7H_2O$)
- and an aqueous solution of 0.1 L containing 16.450 g of lithium hydroxide $LiOH.H_2O$.

These two solutions are added simultaneously to a third aqueous solution of 0.25 L containing 10.070 g of lithium hydroxide $LiOH.H_2O$ and maintained under mechanical stirring so as to form a precipitate. This precipitate is then filtered, washed several times with distilled water and dried for 24 hours at 100° C. in order to obtain precursor A. Precursor A is represented by the general formula $Mn_{0.8}Ni_{0.15}Mg_{0.05}(OH)_2$.

Characterization of the product obtained after the quenching operation confirms synthesis of the $0.75Li_2MnO_3.0.25LiNi_{.6}Mn_{.2}Mg_{0.2}O_2$ compound and its lamellar-type structure.

A "buttoncell" format lithium battery is then achieved with:
- a lithium negative electrode with a diameter of 16 mm and a thickness of 135 µm, deposited on a nickel disk acting as current collector,
- a positive electrode formed by a disk with a diameter of 14 mm taken from a composite film with a thickness of 25 µm comprising the previously synthesized $0.75Li_2MnO_3.0.25LiNi_{0.6}Mn_{0.2}Mg_{0.2}O_2$ material (80% weight), carbon black (10% weight) and polyvinylidene hexafluoride (10% weight), the whole being deposited on a current collector formed by an aluminium foil with a thickness of 20 micrometers,
- a separator imbibed with the $LiPF_6$ salt-base (1 mol/L) liquid electrolyte in solution in a mixture of ethylene carbonate, propylene carbonate and dimethyl carbonate (1/1/3 weight ratio).

The variation of the specific capacity versus the number of cycles corresponding to this lithium battery is represented by plot A in FIG. 1. For comparison purposes, FIG. 1 also comprises plots B and C corresponding to the variation of the specific capacity versus the number of cycles for two similar batteries but respectively implementing $0.7Li_2MnO_3.0.3LiMn_{1/3}Ni_{1/3}Co_{1/3}O_2$ and $0.75Li_2MnO_3.0.25LiNiO_2$ as active positive electrode material. Plot A enables it to be observed that the specific capacity obtained with the $0.75Li_2MnO_3.0.25LiNi_{0.6}Mn_{0.2}Mg_{0.2}O_2$ oxide is relatively constant whatever the number of cycles. On the contrary, with the $0.75Li_2MnO_3.0.25LiNiO_2$ compound according to the prior art and a $0.7Li_2MnO_3.0.3LiMn_{1/3}Ni_{1/3}Co_{1/3}O_2$ compound similar to those of the prior art, the specific capacity decreases rapidly (plots C and B).

According to a second example embodiment (hereafter noted Example n°2), the $0.75Li_2MnO_3.0.25LiNi_{0.9}Mn_{0.05}Mg_{0.05}O_2$ compound was synthesized and then tested in a "buttoncell" format lithium battery similar to the one produced in example n°1.

The $0.75Li_2MnO_3.0.25LiNi_{0.9}Mn_{0.05}Mg_{0.05}O_2$ compound is in particular synthesized by intimately mixing 1.50 g of a previously synthesized precursor A' and 1.11 g of lithium hydroxide $LiOH.H_2O$, and by then heating the mixture at 1000° C. for 24 hours before cooling it very quickly to ambient temperature (quenching). In particular precursor A' was previously synthesized from:
- an aqueous solution of 0.1 L containing 11.528 g of manganese sulphate ($MnSO_4$), 5.083 g of nickel sulphate ($NiSO_4.3.95H_2O$) and 0.308 g of magnesium sulphate ($MgSO_4.7H_2O$),
- an aqueous solution of 0.1 L containing 16.450 g of lithium hydroxide $LiOH.H_2O$.

These two aqueous solutions are added simultaneously to a third aqueous solution of 0.25 L containing 10.070 g of lithium hydroxide $LiOH.H_2O$ and maintained under mechanical stirring. A precipitate forms, before being filtered, washed several times with distilled water and then dried for 60 hours at 100° C. to obtain precursor A'. Precursor A' is represented by the general formula $Mn_{0.7625}Ni_{0.225}Mg_{0.0125}(OH)_2$.

Figure 2:
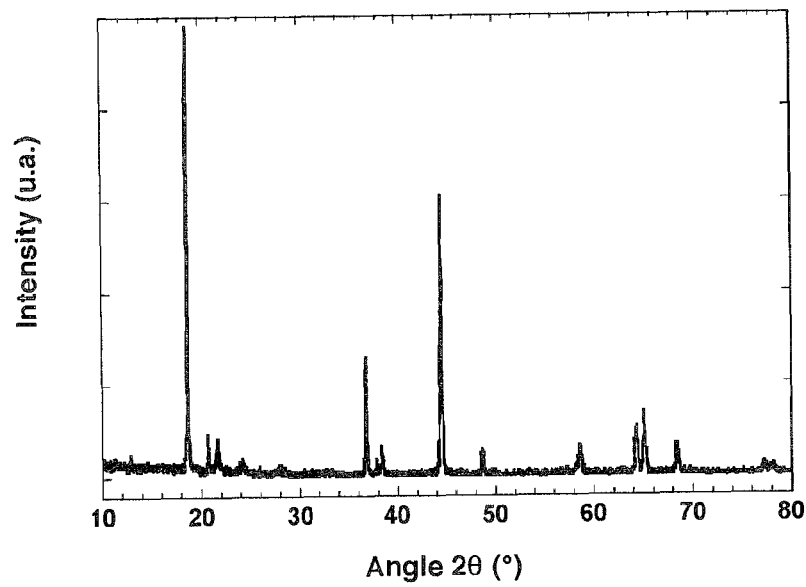
FIG. 2 represents an X-ray diffraction diagram ($\lambda_{cuK\alpha}$) of the compound of formula $0.75Li_2MnO_3.0.25LiNi_{0.9}Mn_{0.05}Mg_{0.05}O_2$ prepared according to a first particular embodiment.
Figure 3:
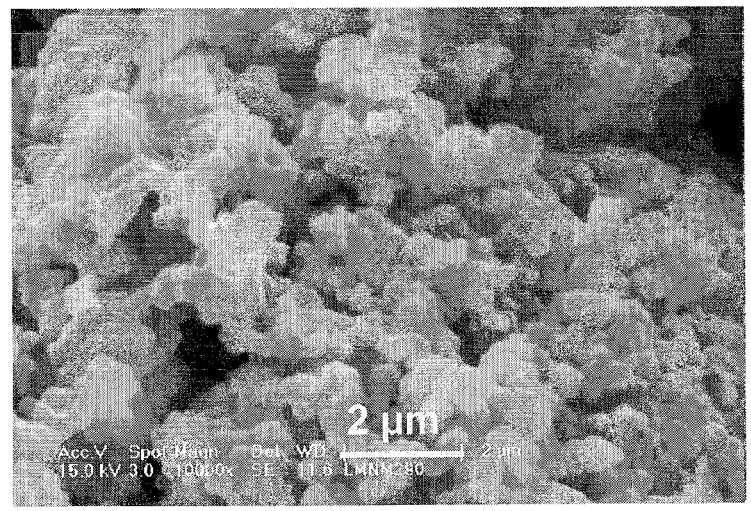
FIG. 3 corresponds to a scanning electron microscopy image of the compound of formula $0.75Li_2MnO_3.0.25LiNi_{0.9}Mn_{0.05}Mg_{0.05}O_2$ prepared according to a first particular embodiment.

The $0.75Li_2MnO_3.0.25LiNi_{0.9}Mn_{0.05}Mg_{0.055}O_2$ compound thus synthesized was characterized by X-ray diffraction (FIG. 2) and by scanning electron microscopy observation (FIG. 3). FIG. 2 enables the composition of the synthesized compound to be confirmed and FIG. 3 confirms the lamellar-type structure of the compound.

Such a compound was further used as active material of a positive electrode in a "buttoncell" format lithium battery similar to the battery produced in example n°1. Only the active material of the positive electrode was replaced in the lithium battery according to example n°1.

Figure 4:
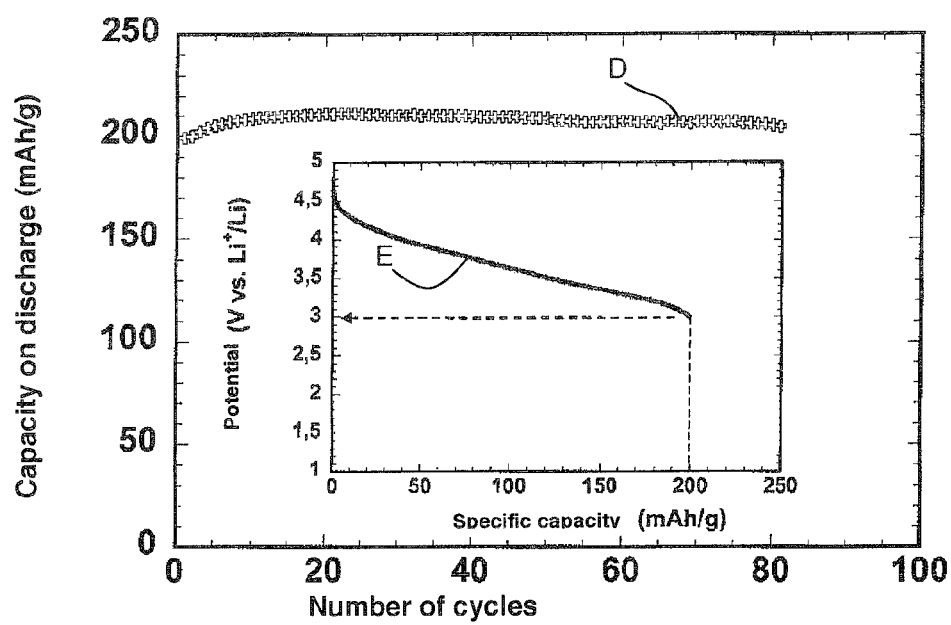
FIG. 4 represents the variation of the specific capacity on discharge versus the number of cycles of a lithium battery comprising the compound $0.75Li_2MnO_3.0.25LiNi_{0.9}Mn_{0.05}Mg_{0.05}O_2$ as active material for the positive electrode, during testing performed in intentiostatic mode under C/10 conditions with a temperature of 55° C., between 3 and 4.8 V vs. Li$^+$/Li.
Figure 5:
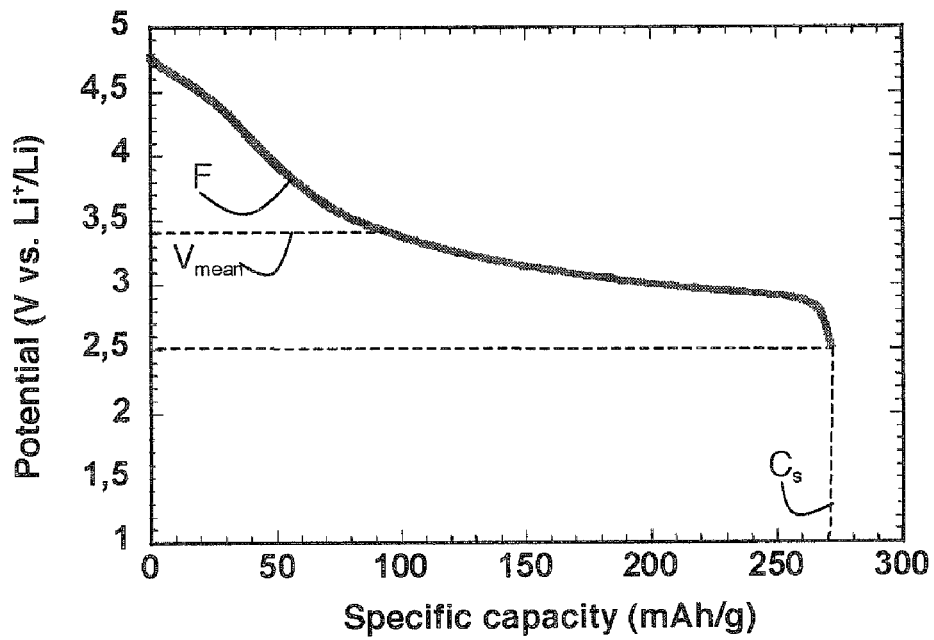
FIG. 5 represents the charging/discharging curve plot (potential versus specific capacity) at the hundredth cycle of a lithium battery comprising the compound $0.75Li_2MnO_3.0.25LiNi_{0.9}Mn_{0.05}Mg_{0.05}O_2$ as active positive electrode material, when testing is performed in intentiostatic mode between 2.5 and 4.8 V vs. Li$^+$/Li, under C/10 conditions at a temperature of 55° C.

FIGS. 4 and 5 illustrate the electrochemical characteristics corresponding to this lithium battery. It can thus be observed in FIG. 4 that the specific capacity of the lithium battery is stable on cycling. The value of the specific capacity (plot D) is in fact substantially constant whatever the number of cycles applied. The mean loss of capacity per cycle is in fact estimated, over the first 80 cycles, at only 0.01%. For comparison purposes, this loss is generally about 0.04% for a commercial Lithium battery.

Furthermore, FIG. 4 comprises an insert representing the first discharge (plot E) of the battery, performed in intentiostatic mode, under C/10 conditions at a temperature of 55° C., for potentials varying between 3 and 4.8V vs Li$^+$/Li. Plot E thus corresponds to the variation of the potential with respect to the potential of the Li$^+$/Li pair, versus the specific capacity. Thus, for a potential of 3V vs Li$^+$/Li, the specific capacity of the battery is 200 mAh/g at the first discharge.

Plot F of FIG. 5 indicates that it is moreover possible to obtain, in the case of the $0.75Li_2MnO_3.0.25LiNi_{0.9}Mn_{0.05}Mg_{0.05}O_2$ compound and after 100 charging/discharging cycles:

a discharged capacity of 271.7 mAh/g, a mean discharge potential of 3.406 V vs. Li$^+$/Li and a mass energy of the material of 925 Wh/kg.

The mass energy is very high in comparison with that obtained with active materials used in currently marketed batteries (generally about 600 Wh/kg), all the more so as it is obtained after a large number of cycles.

Thus, as illustrated by FIGS. 1 to 5, $0.75Li_2MnO_3.0.25LiNi_{0.6}Mn_{0.2}Mg_{0.2}O_2$ and $0.75Li_2MnO_3.0.25LiNi_{0.9}Mn_{0.05}Mg_{0.05}O_2$ oxides, and more generally the oxide family of $xLi_2MnO_3.(1-x)LiM^1_aM^2_bM^3_cO_2$, type enable high capacities to be attained, while at the same time maintaining a good stability over a large number of charging/discharging cycles. In certain cases, it is possible to obtain specific capacity values or more than 300 mAh/g, which represents an increase of 100% compared with the active materials for the positive electrode used in lithium batteries, such as the LiCoO$_2$ oxide.

As illustrated by examples n°1 and 2, the oxides according to the invention are advantageously prepared by thermally treating a powder obtained by mixing a precursor forming a source of elements M$^1$, M$^2$ and M$^3$ in predetermined proportions with lithium hydroxide LiOH.H$_2$O, at a temperature at least equal to 800° C. and more often of about 900° C. to 1000° C. The precursor is in particular represented by the general formula $Mn_xM^1_{a(1-x)}M^2_{b(1-x)}M^3_{c(1-x)}(OH)_2$. Once the heat treatment has been completed, the powder is cooled very quickly, by performing quenching for example.

Furthermore, once synthesized, the oxide can be subjected to post-treatment in a slightly acid aqueous solution to improve its electrochemical properties and therefore the specific capacity of the lithium battery.

Thus, according to a third example embodiment (hereafter noted Example n°3), 10 g of the $0.75Li_2MnO_3.0.25LiNi_{0.9}Mn_{0.05}Mg_{0.05}O_2$ compound obtained according to example n°2 are mixed with 250 mL of an aqueous solution having a pH equal to 5.5. The aqueous solution is for example water in which an acid such as H$_2$SO$_4$ or HNO$_3$ is added to adjust the pH. The mixture is then stirred for 30 minutes, and is then placed in an ultrasonic tank for 10 minutes. The mixture finally placed under magnetic stirring for 24 hours. A centrifugation operation consisting in three washings with water enables a powder to be recovered, which powder is then dried at 50° C. for 24 hours. Finally the powder is subjected to heat treatment at a temperature of 350° C., for 3 hours in air.

The compound treated in this way is then tested as active material for the positive electrode in a "buttoncell" format battery respectively with cycling temperatures at 20° C. and at 55° C. The battery is similar to the batteries produced according to examples n°1 and 2. It thus comprises the same constituents as the batteries produced according to examples n°1 and 2, with the exception of the active material of the positive electrode.

Figure 6:
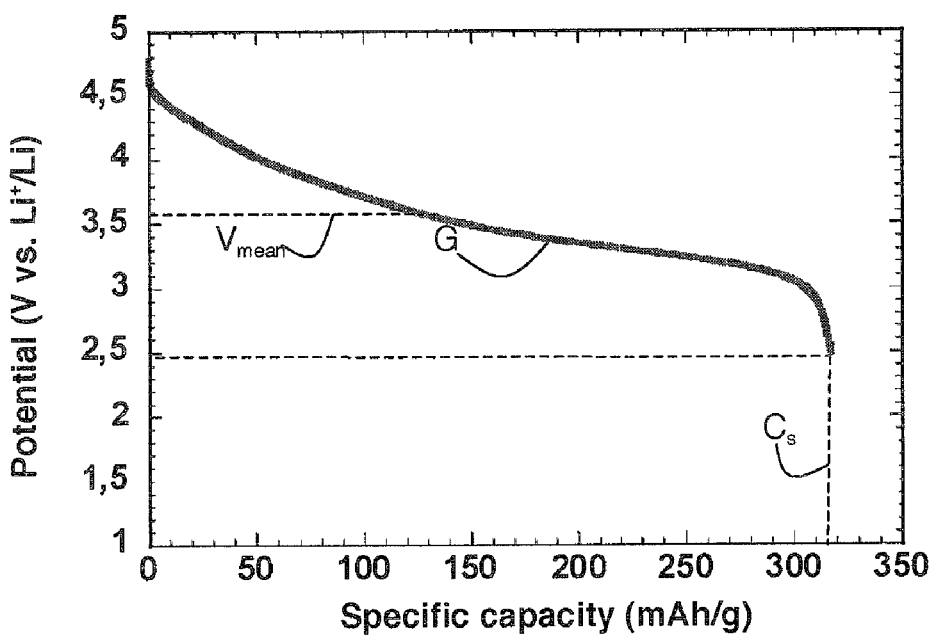
FIGS. 6 and 7 represent the curve plot of the first discharge (potential versus specific capacity) of a lithium battery comprising a compound $0.75Li_2MnO_3.0.25LiNi_{0.9}Mn_{0.05}Mg_{0.05}O_2$ obtained according to an alternative embodiment and used as active positive electrode material, when testing is performed in intentiostatic mode between 2.5 and 4.8 V vs. Li$^+$/Li, under C/10 conditions respectively at a temperature of 55° C. and 20° C.
Figure 7:
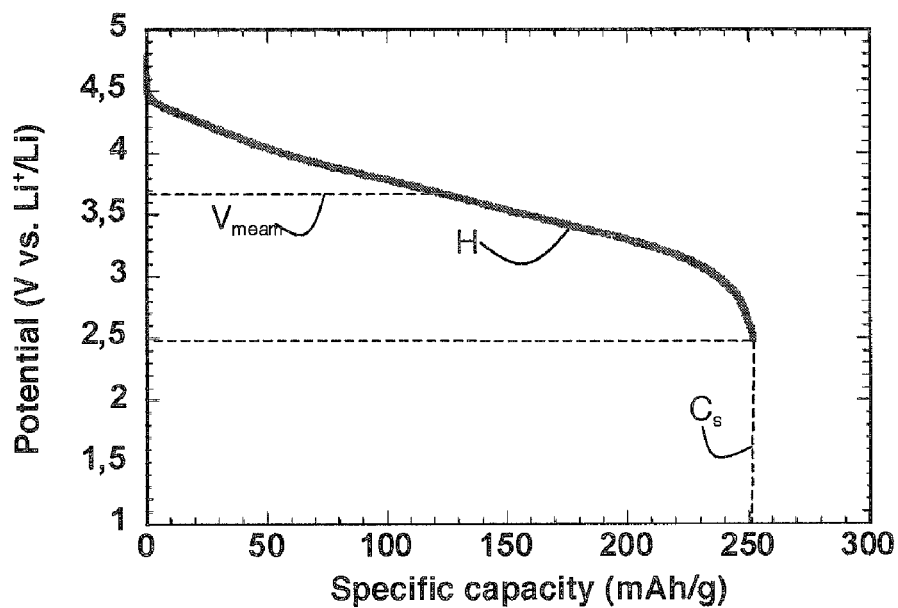
Figure 8:
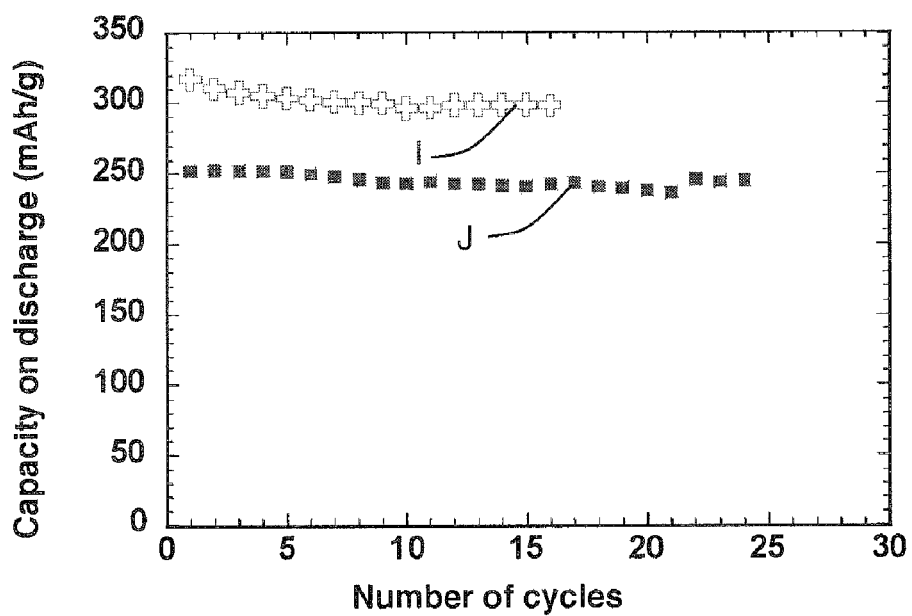
FIG. 8 represents the variation of the specific capacity on discharge versus the number of cycles (C/10 conditions) of lithium batteries the first discharge of which is plotted in FIGS. 6 and 7.

The electrochemical characteristics corresponding to example n°3 are reported in FIGS. 6 to 8.

As illustrated in FIGS. 6 to 8, for C/10 conditions in intentiostatic mode, the specific capacity is equal to 317 mAh/g for a cycling temperature of 55° C. (plot G) and it is 252 mAh/g for a cycling temperature of 20° C. (plot H). In general however, the specific capacity obtained for a cycling temperature of 20° C. with active materials for the positive electrode according to the prior art is lower. For example it is about 150 mAh/g, at 20° C., for compounds of $xLi_2MnO_3.(1-x)LiMO_2$ type. Furthermore, the mean potential on discharge is 3.656 V vs. Li$^+$/Li at 20° C. (i.e. an energy density of 921 Wh/kg of material) and 3.563 V vs. Li$^+$/Li at 55° C. (i.e. an energy density of 1129 Wh/kg of material). Moreover, as represented by plots I (cycling temperature=55° C.) and J (cycling temperature=20° C.) of FIG. 8, the specific capacity on discharge is stable whatever the number of cycles, for a cycling temperature of both 55° C. and 20° C.

The invention claimed is:

1. A lamellar-type oxide of general formula $xLi_2MnO_3.(1-x)LiM^1_aM^2_bM^3_cO_2$, with:

x is about 0.75,

M$^1$ is a chemical element selected from a first group consisting of Mn, Ni, Co, Fe, Ti, Cr, V and Cu, M$^3$ is at least a chemical element selected from a second group consisting of Mg, Zn, Al, Na, Ca, Li, K, Sc, B, C, Si, P and S, M$^2$ is a chemical element selected from the first group and the second group and it is different from M$^1$ and from M$^3$, and a+b+c=1, with a, b and c not zero.

2. The oxide according to claim 1, wherein M$^1$=Ni, M$^2$=Mn, and M$^3$=Mg.

3. The oxide according to claim 1, wherein b=c.

4. The oxide according to claim 1, wherein it is represented by the formula $0.75Li_2MnO_3.0.25LiNi_{0.9}Mn_{0.05}Mg_{0.05}O_2$.

5. The oxide according to claim 1, wherein it is represented by the formula $0.75Li_2MnO_3.0.25LiNi_{0.6}Mn_{0.2}Mg_{0.2}O_2$.

6. A method for synthesizing a lamellar-type oxide of general formula $xLi_2MnO_3.(1-x)LiM^1_aM^2_bM^3_cO_2$, with:

x is about 0.75,

M$^1$ is a chemical element selected from a first group consisting of Mn, Ni, Co, Fe, Ti, Cr, V and Cu, M$^3$ is at least a chemical element selected from a second group consisting of Mg, Zn, Al, Na, Ca, Li, K, Sc, B, C, Si, P and S, M$^2$ is a chemical element selected from the first group and the second group and it is different from M$^1$ and from M$^3$, and a+b+c=1, with a, b and c not zero wherein the method comprises heat treatment of a powder obtained by mixing a precursor of general formula $Mn_xM^1_{a(1-x)}M^2_{b(1-x)}M^3_{c(1-x)}(OH)_2$ with lithium hydroxide, followed by very rapid cooling of said powder, wherein the heat treatment of the powder is achieved at a temperature greater than or equal to 800° C.

7. The method according to claim 6, wherein after the very rapid cooling, the powder undergoes post-treatment in a slightly acid aqueous solution.

8. The method according to claim 6, wherein the very rapid cooling is achieved by quenching.

9. The method according to claim 6, wherein M$^1$=Ni, M$^2$=Mn, and M$^3$=Mg.

10. The method according to claim 6, wherein, wherein b=c.

11. The method according to claim 6, wherein the precursor is represented by the general formula $Mn_{0.7625}Ni_{0.225}Mg_{0.0125}(OH)_2$.

12. The method according to claim 6, wherein the precursor is represented by the general formula $Mn_{0.8}Ni_{0.15}Mg_{0.05}(OH)_2$.

13. A positive electrode comprising an active material wherein the active material consists of a lamellar-type oxide of general formula:

$$x Li_2MnO_3.(1-x)LiM^1{}_a M^2{}_b M^3{}_c O_2$$

with:

x is about 0.75, $M^1$ is a chemical element selected from a first group consisting of Mn, Ni, Co, Fe, Ti, Cr, V and Cu, $M^3$ is at least a chemical element selected from a second group consisting of Mg, Zn, Al, Na, Ca, Li, K, Sc, B, C, Si, P and S, $M^2$ is a chemical element selected from the first group and the second group and it is different from $M^1$ and from $M^3$, a+b+c=1, with a, b and c not zero.

14. The positive electrode according to claim 13, wherein $M^1$=Ni, $M^2$=Mn, and $M^3$=Mg.

15. The positive electrode according to claim 13, wherein b=c.

16. The positive electrode according to claim 13, wherein the lamellar-type oxide is represented by the formula $0.75Li_2MnO_3.0.25LiNi_{0.9}Mn_{0.05}Mg_{0.05}O_2$.

17. The positive electrode according to claim 13, wherein the lamellar-type oxide is represented by the formula $0.75Li_2MnO_3.0.25LiNi_{0.6}Mn_{0.2}Mg_{0.2}O_2$.

18. A lithium battery including a positive electrode wherein the positive electrode comprises as active material a lamellar-type oxide of general formula $$x Li_2MnO_3.(1-x)LiM^1{}_a M^2{}_b M^3{}_c O_2, \text{ with:}$$

x is about 0.75, $M^1$ is a chemical element selected from a first group consisting of Mn, Ni, Co, Fe, Ti, Cr, V and Cu, $M^3$ is at least a chemical element selected from a second group consisting of Mg, Zn, Al, Na, Ca, Li, K, Sc, B, C, Si, P and S, $M^2$ is a chemical element selected from the first group and the second group and it is different from $M^1$ and from $M^3$, and a+b+c=1, with a, b and c not zero.

19. The lithium battery according to claim 18, wherein $M^1$=Ni, $M^2$=Mn, and $M^3$=Mg.

20. The lithium battery according to claim 18, wherein b=c.

21. The lithium battery according to claim 18, wherein the lamellar-type oxide is represented by the formula $0.75Li_2MnO_3.0.25LiNi_{0.9}Mn_{0.05}Mg_{0.05}O_2$.

22. The lithium battery according to claim 18, wherein the lamellar-type oxide is represented by the formula $0.75Li_2MnO_3.0.25LiNi_{0.6}Mn_{0.2}Mg_{0.2}O_2$.

* * * * *